US012330730B2

(12) United States Patent
Burguess et al.

(10) Patent No.: US 12,330,730 B2
(45) Date of Patent: Jun. 17, 2025

(54) RAPID UNDERBODY KIT DEPLOYMENT CRATE

(71) Applicant: Government of the United States, as represented by the Secretary of the Army, Washington, DC (US)

(72) Inventors: Victor Wilhelm Burguess, Royal Oak, MI (US); Frederick Carl Rickert, II, Royal Oak, MI (US)

(73) Assignee: Government of the United States, as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/631,313

(22) Filed: Apr. 10, 2024

(65) Prior Publication Data

US 2024/0253717 A1    Aug. 1, 2024

Related U.S. Application Data

(62) Division of application No. 17/375,330, filed on Jul. 14, 2021, now Pat. No. 11,993,329.

(51) Int. Cl.
| | |
|---|---|
| B62D 65/02 | (2006.01) |
| B66F 3/35 | (2006.01) |
| B66F 3/36 | (2006.01) |
| B62D 21/15 | (2006.01) |
| B62D 25/20 | (2006.01) |

(52) U.S. Cl.
CPC .............. *B62D 65/024* (2013.01); *B66F 3/35* (2013.01); *B66F 3/36* (2013.01); *B62D 21/155* (2013.01); *B62D 25/2072* (2013.01)

(58) Field of Classification Search
CPC .......................... B62D 65/024; B62D 21/155; B62D 25/2072; B66F 3/35; B66F 3/36; B66F 7/085; B66F 7/08; B66F 3/40; B66F 3/25
See application file for complete search history.

(56) References Cited

U.S. PATENT DOCUMENTS 4,275,869 A * 6/1981 Clements .................. B66F 3/35
254/93 HP

* cited by examiner

*Primary Examiner* — Lee A Holly

(57) ABSTRACT

A method of installing an underbody kit to a vehicle comprising providing a rapid underbody kit deployment crate comprising a pallet, at least one inflatable bladder, and at least one cover; removing the at least one cover from the pallet; placing the underbody kit onto the pallet and the at least one inflatable bladder; securing the at least one cover back onto the pallet; transporting the rapid underbody kit deployment crate to an assembly location; removing the at least one cover from the pallet; driving the vehicle over the rapid underbody kit deployment crate; inflating the at least one inflatable bladder to vertically lift the underbody kit into installation position; installing the underbody kit to an underbody of the vehicle; deflating the at least one inflatable bladder by releasing the fluid from the at least one inflatable bladder; and driving the vehicle away from the rapid underbody kit deployment crate.

9 Claims, 6 Drawing Sheets

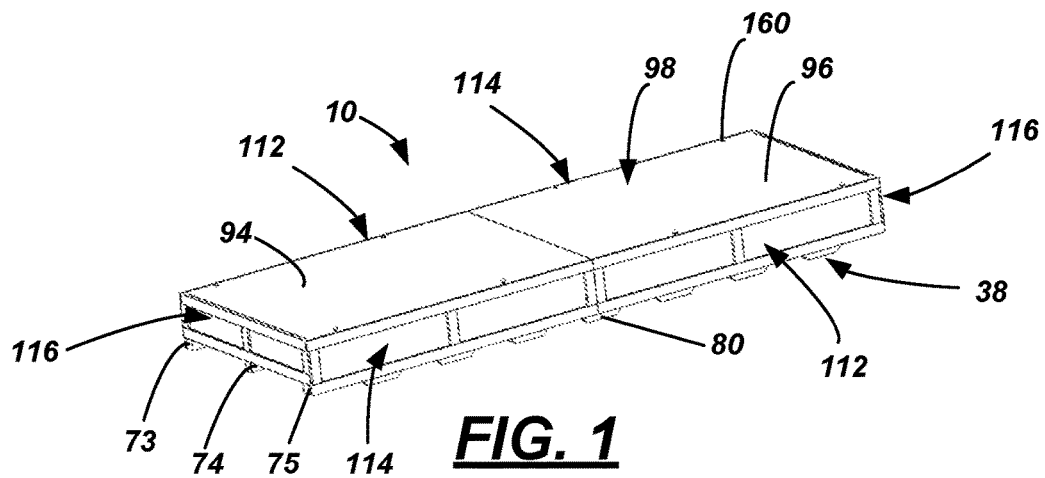
FIG. 1
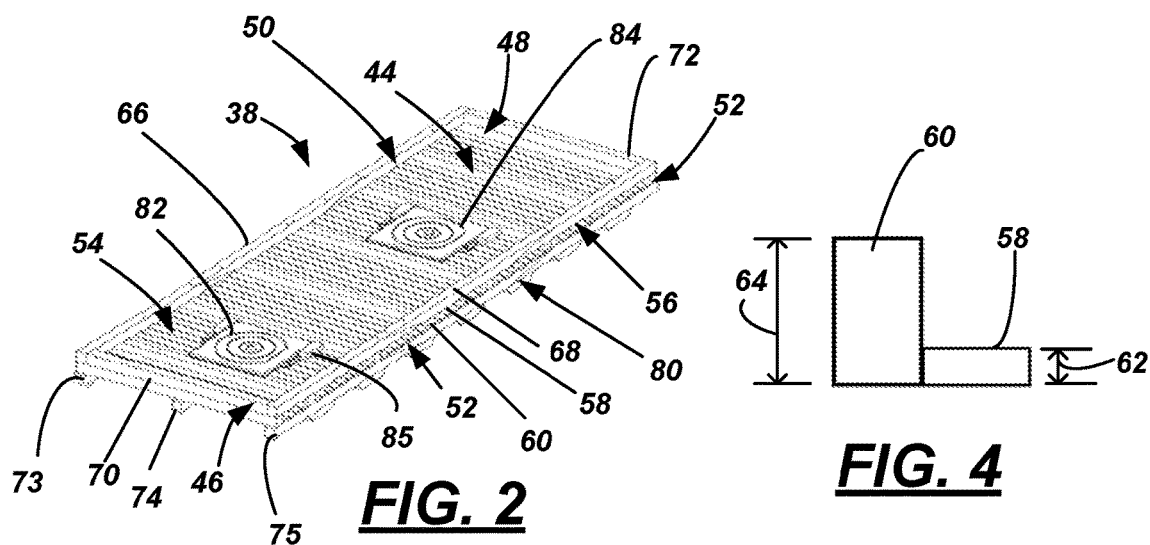
FIG. 2
FIG. 4
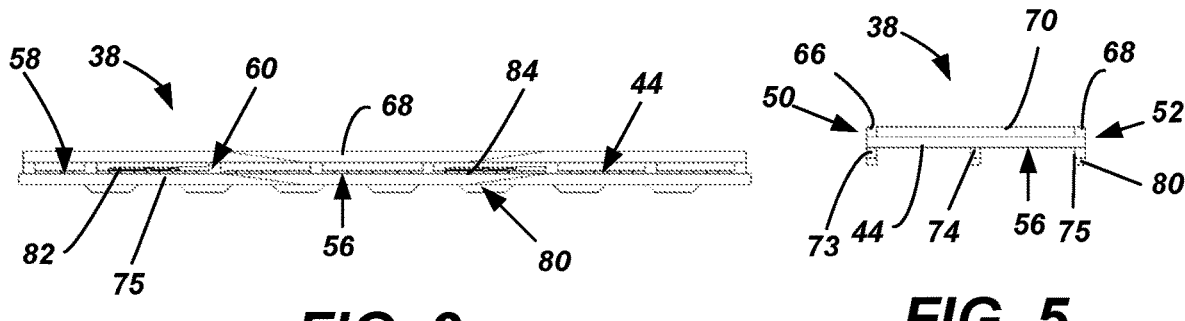
FIG. 3
FIG. 5

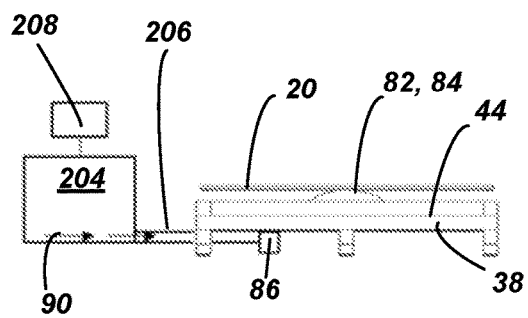
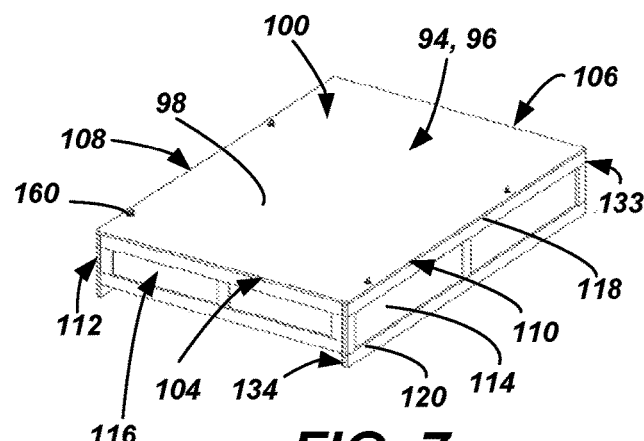
FIG. 6
FIG. 7
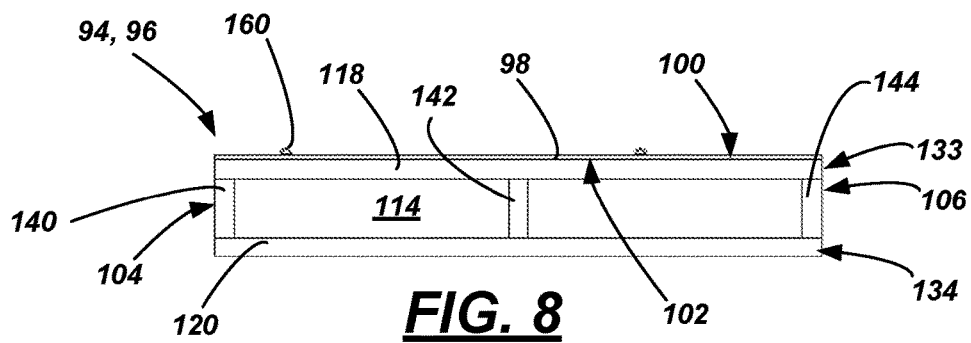
FIG. 8
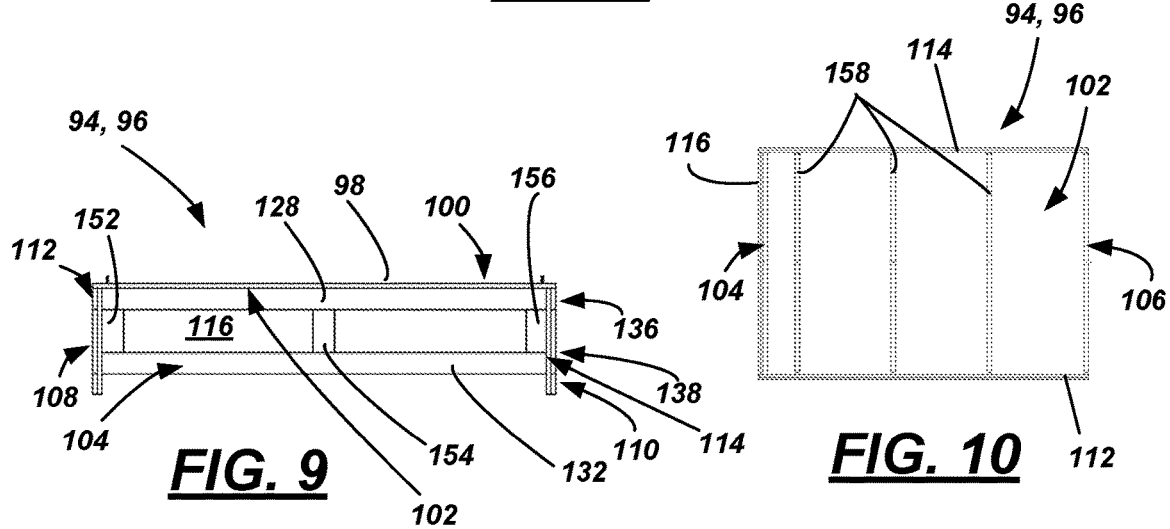
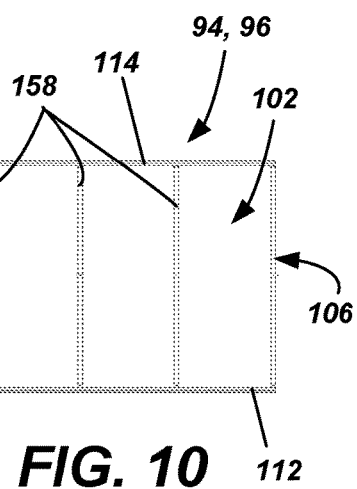
FIG. 9
FIG. 10

RAPID UNDERBODY KIT DEPLOYMENT CRATE

GOVERNMENT INTEREST

The invention described herein may be made, used, or licensed by or for the U.S. Government. The U.S. Government has rights in the invention(s).

TECHNICAL FIELD

The field to which the disclosure generally relates includes underbody kits.

BACKGROUND

In a number of variations, a military vehicle may include an underbody kit which may increase protection of the vehicle against underbody threats.

SUMMARY OF ILLUSTRATIVE VARIATIONS

A number of variations may include an rapid underbody kit deployment crate comprising: a pallet constructed and arranged to accommodate an underbody kit; at least one inflatable bladder attached to the pallet, wherein the at least one inflatable bladder is constructed and arranged to vertically lift and lower the underbody kit; and at least one cover constructed and arranged to enclose the underbody kit and at least a portion of the pallet.

A number of variations may include a method of installing an underbody kit to a vehicle comprising: providing an rapid underbody kit deployment crate comprising a pallet, at least one inflatable bladder attached to the pallet, and at least one cover; removing the at least one cover of the rapid underbody kit deployment; placing the underbody kit onto the pallet and the at least one inflatable bladder; placing the at least one cover over the underbody kit and onto the pallet; transporting the rapid underbody kit deployment crate to an assembly location; removing the at least one cover from the rapid underbody kit deployment crate; driving the vehicle over the rapid underbody kit deployment crate; inflating the at least one inflatable bladder with a fluid to vertically lift the underbody kit into installation position; attaching the underbody kit to an underbody of the vehicle; deflating the at least one inflatable bladder by releasing the fluid from the at least one inflatable bladder; and driving the vehicle away from the rapid underbody kit deployment crate.

A number of variations may include a method of removing an underbody kit from a vehicle comprising providing an rapid underbody kit deployment crate comprising a pallet, at least one inflatable bladder attached to the pallet, and at least one cover; removing the at least one cover from the rapid underbody kit deployment crate; driving the vehicle over the rapid underbody kit deployment crate; inflating the at least one inflatable bladder with a fluid so that the at least one inflatable bladder reaches the underbody kit; removing the underbody kit hardware from the vehicle thereby releasing the underbody kit onto the at least one inflatable bladder; deflating the at least one inflatable bladder by releasing the fluid from the at least one inflatable bladder; driving the vehicle away from the rapid underbody kit deployment crate; and placing the at least one cover back onto the pallet.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a perspective view of a rapid underbody kit deployment crate according to a number of variations.

FIG. 2 illustrates a perspective view of a rapid underbody kit deployment crate pallet with inflatable bladders, according to a number of variations.

FIG. 3 illustrates a side view of a rapid underbody kit deployment crate pallet with inflatable bladders, according to a number of variations.

FIG. 4 illustrates a close-up view of a section of a pallet floor according to a number of variations.

FIG. 5 illustrates an end view of a rapid underbody kit deployment crate pallet according to a number of variations.

FIG. 6 illustrates a schematic of inflating an inflatable bladder according to a number of variations.

FIG. 7 illustrates a perspective view of a rapid underbody kit deployment crate cover according to a number of variations.

FIG. 8 illustrates a side view of a rapid underbody kit deployment crate cover according to a number of variations.

FIG. 9 illustrates an end view of a rapid underbody kit deployment crate cover according to a number of variations.

FIG. 10 illustrates a bottom view of a rapid underbody kit deployment crate cover according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 11:
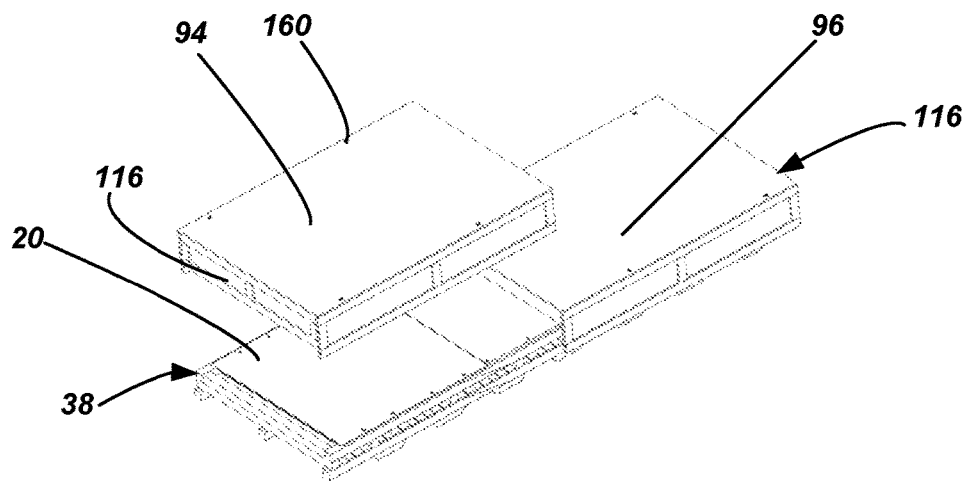
FIG. 11 illustrates a perspective view of a rapid underbody kit deployment crate containing an underbody kit according to a number of variations.
Figure 12:
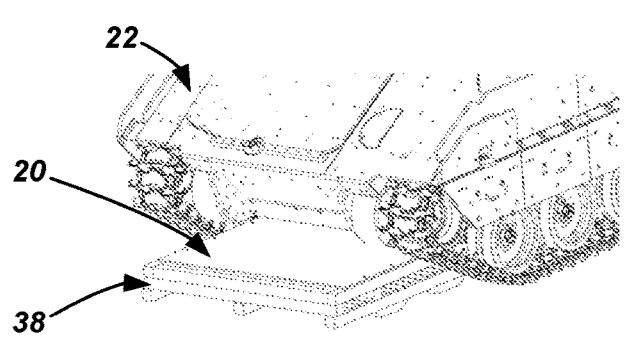
FIG. 12 illustrates a perspective view of a vehicle partially over a rapid underbody kit deployment crate pallet holding an underbody kit according to a number of variations.

In a number of variations, FIG. 1 illustrates a rapid underbody kit deployment crate 10 which may be used to install and/or remove an underbody kit 20 (a variation of which is illustrated in FIG. 11) onto or from a vehicle 22 (a variation of which is illustrated in FIG. 12). In a number of variations, the rapid underbody kit deployment crate 10 may also be used to store and/or ship an underbody kit 20. Referring to FIGS. 1 and 2, in a number of variations, a rapid underbody kit deployment crate 10 may include a pallet 38, at least one inflatable bladder 82, 84, and at least one cover 94, 96.

Referring to FIGS. 2, 3, and 5, in a number of variations, the pallet 38 may comprise a floor 44, a plurality of support beams 66, 68, 70, 72, and a plurality of skids 73, 74, 75. Referring to FIGS. 2 and 4, in a number of variations, the floor 44 may comprise a plurality of first beams 58 and a plurality of second beams 60 interposed between the plurality of first beams 58. In a number of variations, the number of the plurality of first beams 58 may be greater than the number of the plurality of second beams 60. Referring to FIG. 4, in a number of variations, the plurality of first beams 58 may each have a height 62 which may be less than a height 64 of each of the plurality of second beams 60.

In a number of variations, the plurality of second beams 60 may be constructed and arranged to act as load bearing beams and may increase the rigidity of the pallet 38 so that the pallet 38 may support additional weight put on the pallet 38 including, but not limited to, additional weight from an underbody kit 20 and/or additional weight from stacking of multiple rapid underbody kit deployment crate rapid underbody kit deployment crates 10 on top of each other. The increased rigidity of the pallet 38 from the plurality of second beams 60 may also accommodate stress applied to the pallet 38 resulting from the inflation and deflation of the at least one inflatable bladder 82, 84, as will be discussed hereafter.

Referring to FIG. 2, in a number of variations, a first side support beam 66 may be attached to a first face 54 of the floor 44 adjacent a first side surface 50 of the floor 44. In a number of variations, a second side support beam 68 may be attached to the first face 54 of the floor 44 adjacent a second side surface 52 of the floor 44 opposite of the first side surface 50. In a number of variations, a first end support beam 70 may be attached to the first face 54 of the floor 44 adjacent a first end surface 46 of the floor 44 and a second end support beam 72 may be attached to first face 54 of the floor 44 adjacent the second end surface 48 of the floor 44. In a number of variations, the first side support beam 66, the second side support beam 68, the first end support beam 70, and the second end support beam 72 may be constructed and arranged to increase the rigidity and strength of the pallet 38 and may provide support for the at least one cover 94, 96.

Referring to FIGS. 2 and 5, in a number of variations, a plurality of skids 73, 74, 75 may be spaced apart along a second face 56 of the floor 44 opposite of the first face 54. In one variation, a first skid 73 may be attached to the second face 56 of the floor 44 adjacent the first side surface 50 of the floor 44, a second skid 75 may be attached to the second face 56 of the floor 44 adjacent the second side surface 52 of the floor 44, and a third skid 74 may be attached to the second face 56 of the floor 44 between the first skid 73 and the second skid 75.

Referring to FIGS. 1, 2, 3, and 5, in a number of variations, the pallet 38 may further include a plurality of rubbing strips 80 which be attached to the plurality of skids 73, 74, 75. In a number of variations, the use of the plurality of rubbing strips 80 may provide additional space between the ground and the pallet floor 44 which may allow a fork lift, crane, or other moving equipment (not illustrated) to access at least a portion of the bottom of the pallet 38 to lift the rapid underbody kit deployment crate 10 to transport the rapid underbody kit deployment crate 10. In a number of variations, the rubbing strips 80 may be any number of shapes including, but not limited to, trapezoidal.

In a number of variations, the floor 44, the support beams 66, 68, 70, 72, the skids 73, 74, 75, and the rubbing strips 80 (if used) may comprise any number of materials including, but not limited to, wood, aluminum, steel, plastic, or composite materials and may be attached together in any number of variations including, but not limited to, a plurality of mechanical fasteners, adhesives, and/or welding (not illustrated).

Figure 13:
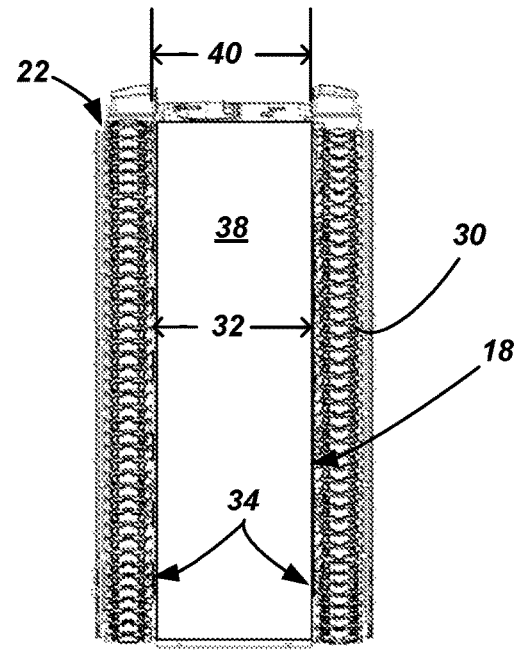
FIG. 13 illustrates a bottom view of a vehicle over a rapid underbody kit deployment crate according to a number of variations.

Referring to FIG. 13, in a number of variations, the pallet 38 may have a width 40 which may index a width 32 between inner surfaces 34 of opposing tires/tracks 30 of a vehicle 22 so that driving over the pallet 38 with the vehicle 22 causes automatic lateral positioning of the underbody 24 of the vehicle 22 over the underbody kit 20, as will be discussed hereafter.

Figure 14:
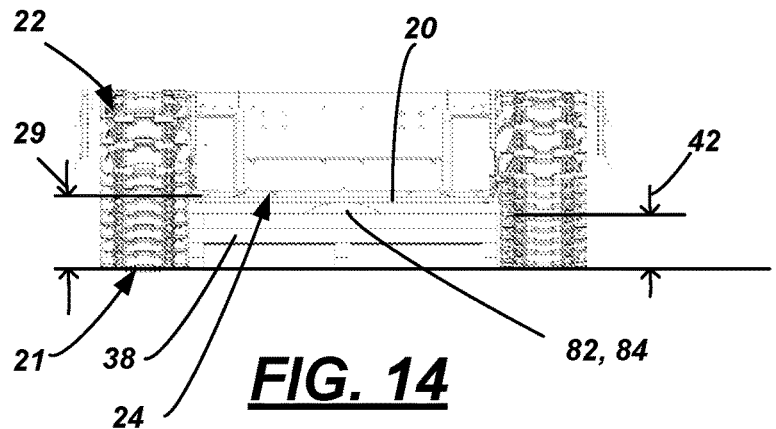
FIG. 14 illustrates an end view of a vehicle over a rapid underbody kit deployment crate pallet with inflated inflatable bladders lifting an underbody kit according to a number of variations.

Referring to FIG. 14, in a number of variations, the pallet 38 may have a height 42 which is less than a distance 29 between a ground surface 21 and an underbody 24 of a vehicle 22 so that the vehicle 22 may be driven over the rapid underbody kit deployment crate pallet 38 and so that there may be adequate space to inflate the at least one inflatable bladder 82, 84, to install an underbody kit 20, as will be discussed hereafter.

The above construction of the pallet 38 is for illustrative purposes only, and it is noted that any number of designs and arrangements may be used to construct the pallet 38 depending on underbody kit 20 and vehicle 22 requirements.

Referring to FIG. 2, in a number of variations, at least one inflatable bladder 82, 84 may be attached to the floor 44 of the pallet 38. In a number of variations, the at least one inflatable bladder 82, 84 may be attached to the floor 44 using one or more inflatable bladder supports 85.

Referring to FIG. 6, in a number of variations, the at least one inflatable bladder 82, 84 may be constructed and arranged to be inflated and deflated by filling or releasing a fluid 90 including, but not limited to, a pressurized fluid such as air or water, into or out of the at least one inflatable bladder 82, 84. In a number of variations, the at least one inflatable bladder 82, 84 may include a valve 86 which may be constructed and arranged to attach to a hose 206 which may be attached to a fluid compressor 204 to receive the fluid 90 from the fluid compressor 204 into the at least one inflatable bladder 82, 84. In one variation, the valve 86 may be located underneath the floor 44 of the pallet 38.

In a number of variations, a controller 208 may be connected to the fluid compressor 204 and may be used to control the supply of fluid 90 into and out of the at least one inflatable bladder 82, 84. In a number of variations, the controller 208 may be used to fill the at least one inflatable bladder 82, 84 with the fluid 90 in a controlled manner so that the at least one inflatable bladder 82, 84 extends a distance vertically upward from the floor 44 of the pallet 38. In a number of variations, the controller 208 may also be used to control the deflation of the at least one inflatable bladder 82, 84. In a number of variations, the controller 208 may include a pressure relief valve (not illustrated) which may prevent over pressurization of the inflatable bladder(s) 82, 84. In a number of variations, the controller 208 may also be stored/shipped in the rapid underbody kit deployment crate 10.

In a number of variations, the at least one inflatable bladder 82, 84 may be of a size and shape which may safely support an underbody kit 20. In one variation, the at least one inflatable bladder 82, 84 may be constructed and arranged to lift an underbody kit 20 that weighs approximately 50 tons. In a number of variations, the inflatable bladder(s) 82, 84 may be constructed and arranged to inflate to a maximum height which allows the underbody kit 20 to reach a distance adjacent the underbody 24 of the vehicle 22. In a number of variations, the inflatable bladder(s) 82, 84 may also be constructed and arranged so that when the inflatable bladder(s) 82, 84 is inflated at its highest point, there is enough stiffness and support so that the lifted underbody kit 20 does not teeter on the inflatable bladder 82, 84. In a number of variations, the at least one inflatable bladder 82, 84 may be constructed and arranged so that it is unrestricted on the pallet 38 during inflation which may allow for controlled lateral and fore and aft movement of the underbody kit 20 which may assist in alignment of the underbody kit 20 with the underbody 24 of the vehicle 22 during installation.

Referring again to FIG. 2, in a number of variations, the at least one inflatable bladder 82, 84 may comprise a first inflatable bladder 82 positioned adjacent a first end surface 46 of the floor 44 of the pallet 38 and a second inflatable bladder 84 spaced a distance from the first inflatable bladder 82 on the floor 44.

The above arrangement of the inflatable bladders 82, 84 is for illustrative purposes only, and it is noted that any number of inflatable bladders, inflatable bladder designs, and inflatable bladder arrangements may be used in the rapid underbody kit deployment crate 10 depending on underbody kit 20 and vehicle 22 requirements.

Referring to FIG. 1, in a number of variations, the at least one cover 94, 96 may be constructed and arranged to enclose and protect an underbody kit 20 during shipping and/or storage of the underbody kit 20. In a number of variations, the at least one cover may comprises at least one panel 98, opposing end walls 116 extending downward from the at least one panel 98, and at least one first side wall 112, 114, and at least one second side wall 112, 114 extending downward from the at least one panel 98, opposite of the at least one first side wall 112, 114. In a number of variations, the at least one cover 94, 96 may be constructed and arranged to enclose an underbody kit 20 resting on the pallet 38 and at least a portion of the pallet 38. In a number of variations, the cover may be one single unit, or the cover may comprise multiple segments 94, 96, variations of which are illustrated in FIGS. 1 and 11. In a number of variations, the use of two or more covers 94, 96 may be easier for a soldier to maneuver than a single cover.

Referring to FIGS. 1 and 7-10, in a number of variations, the at least one cover 94, 96 may include a first cover segment 94 and a second cover segment 96. In a number of variations, each of the first cover segment 94 and the second cover segment 96 may include a rectangular panel 98 having a first face 100, a second face 102 (best illustrated in FIGS. 8 and 10) opposite of the first face 100, a first end surface 104, a second end surface 106 opposite of the first end surface 104, a first side surface 108, and a second side surface 110 opposite of the first side surface 108. In a number of variations, a first side wall 112 may extend downward perpendicularly from the second face 102 of the rectangular panel 98 adjacent the first side surface 108 of the rectangular panel 98. In a number of variations, a second side wall 114 may extend perpendicularly downward from the second face 102 of the rectangular panel 98 adjacent the second side surface 110 of the rectangular panel 98. In a number of variations, an end wall 116 may extend perpendicularly downward from the second face 102 of the rectangular panel 98 between the first side wall 112 and the second side wall 114, adjacent the first end surface 104 of the rectangular panel 98.

Referring to FIGS. 7 and 8, in a number of variations, an upper side support 118 may be attached to each of the first side wall 112 and the second side wall 114, respectively, at a first end 133 of the first side wall 112 and the second side wall 114, respectively, adjacent the rectangular panel 98. In a number of variations, a lower side support 120 may be attached to each of the first side wall 112 and the second side wall 114, respectively, adjacent a second end 134 of each of the first side wall 112 and the second side wall 114.

Referring to FIG. 9, in a number of variations, an upper end support 128 may be attached to a first end 136 of the end wall 116 adjacent the rectangular panel 98 and a lower end support 132 may be attached to a second end 138 of the end wall 116 opposite of the first end 136 of the end wall 116.

Referring to FIG. 8, in a number of variations, a first plurality of vertical supports 140, 142, 144 may be attached to each of the first and second side walls 112, 114 between the upper side supports 118 and the lower supports 120. In a number of variations, the first plurality of vertical supports 140, 142, 144 may include a first vertical support 140 adjacent the first end 104 of the rectangular panel 98, a second vertical support 142 between each of the first and second ends 104, 106 of the rectangular panel 98, and a third vertical support 144 adjacent the second end 106 of the rectangular panel 98.

Referring to FIG. 9, in a number of variations, a second plurality of vertical supports 152, 154, 156 may be attached to the end wall 116 between the upper end support 128 and the lower end support 132. In a number of variations, the second plurality of vertical supports 152, 154, 156 may include a first vertical support 152 adjacent the first side wall 112, a second vertical support 154 between the first side wall 112 and the second side wall 114, and a third vertical support 156 adjacent the second side wall 114.

Referring to FIG. 10, in a number of variations, a plurality of inner cover supports 158 may be spaced apart and attached to the second face 102 of the rectangular panel 98. In a number of variations, a first, second, and third inner cover support 158 may be used.

In a number of variations, the upper supports 118, the lower supports 120, the upper end support 128, the lower end support 132, the first plurality of vertical supports 140, 142, 144, the second plurality of vertical supports 152, 154, 156, and the plurality of inner cover supports 158 may be constructed and arranged to provide additional support and structure to the cover 94, 96 to increase the rigidity and strength of the cover(s) 94, 96 which may allow for stacking of multiple rapid underbody kit deployment crates 10 on top of each other.

Referring to FIGS. 7 and 8, in a number of variations, one or more attachment mechanisms 160 including, but not limited to, eye bolts, may be attached to the at least one cover 94, 96. In a number of variations, one or more attachment mechanisms 160 may be attached to the first face 100 of the rectangular panel 98 and may be constructed and arranged to mate with a hook, d-ring, or another attachment device on a crane or other lifting device to assist in the assembly of the cover(s) 94, 96 onto the pallet 38 or the removal of the cover(s) 94, 96 from the pallet 38, as will be discussed hereafter.

Referring again to FIG. 1, in a number of variations, the first cover segment 94 and the second cover segment 96 may be positioned on the pallet 38 such that the end walls 116 are disposed at opposite ends of each other so that the contents of the pallet 38 are enclosed.

In a number of variations, the at least one cover 94, 96 may be attached to the pallet 38 using one or more mechanical fasteners (not illustrated) including, but not limited to, lag screws and washers, so that the at least one cover 94, 96 may stay in place during shipping and/or storage.

In a number of variations, the cover(s) 94, 96 may comprise any number of materials including, but not limited to, wood, aluminum, steel, plastic or composite materials and may be attached together using a plurality of mechanical fasteners, adhesives, and/or welding (not illustrated).

The above construction of the cover(s) 94, 96 is for illustrative purposes only, and it is noted that any number of covers, cover designs, and cover arrangements may be used depending on underbody kit 20 and vehicle 22 requirements.

Referring to FIGS. 1, 11-18, in a number of variations, the rapid underbody kit deployment crate 10 may be used to install an underbody kit 20 to a vehicle 22 underbody 24. Referring to FIGS. 1 and 11, in a number of variations, an underbody kit 20 may be positioned on top of the deflated inflatable bladder(s) 82, 84 (FIG. 11) and enclosed by the cover(s) 94, 96 (FIG. 1) of the rapid underbody kit deployment crate 10 so that the underbody kit 20 may be stored and/or shipped using the rapid underbody kit deployment crate 10. In one variation, the at least one cover 94, 96 may be secured to the pallet 38 using one or more mechanical fasteners (not illustrated). In a number of variations, when the underbody kit 20 is ready to be assembled onto a vehicle 22, the rapid underbody kit deployment crate 10 may be transported to any number of assembly locations including, but not limited to, a manufacturing area or in the field.

Referring to FIG. 11, in a number of variations, once the rapid underbody kit deployment crate 10 is transported to the desired assembly location, the at least one cover 94, 96 of the rapid underbody kit deployment crate 10 may be removed from the pallet 38. In a number of variations, the at least one cover 94, 96 may be removed from the pallet 38 by first removing any mechanical fasteners used to secure the at least one cover 94, 96 to the pallet 38, and then attaching one or more hooks on a crane or other lifting device (not illustrated) to the one or more attachment devices 160 on the cover(s) 94, 96 of the underbody kit 20. The crane or other lifting device may then be used to vertically lift the cover(s) 94, 96 off of the pallet 38.

Referring to FIG. 12, in a number of variations, once the cover(s) 94, 96 is removed from the pallet 38, a vehicle 22 may be driven over the pallet 38. Referring to FIG. 13, in a number of variations, the width 40 of the rapid underbody kit deployment crate pallet 38 may be approximately equal to a width 32 of the distance between the vehicle's tires or tracks 30 such that when the vehicle 22 is driven over the rapid underbody kit deployment crate pallet 38, the inner surfaces 34 of the tires or tracks 30 may brush against the outer surfaces side 18 of the rapid underbody kit deployment crate pallet 38 which may cause automatic lateral positioning of the vehicle 22 over the underbody kit 20. In a number of variations, the automatic lateral positioning of the vehicle 22 over the underbody kit 20 may eliminate the need for additional pallet 38 movement and/or alignment during installation.

Figure 15:
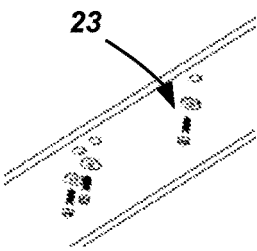
FIG. 15 illustrates a close-up view of underbody kit hardware according to a number of variations.

Referring to FIG. 14, in a number of variations, once the vehicle 22 is driven over the pallet 38, the at least one inflatable bladder 82, 84 may be inflated to vertically lift the underbody kit 20, as discussed above. In a number of variations, if more than one inflatable bladder 82, 84 is used, the inflatable bladders 82, 84 may be inflated simultaneously to ensure steady lifting of the underbody kit 20. In another variation, if more than one inflatable bladder 82, 84 is used, the inflatable bladders 82, 84 may be inflated independently to install different pieces of an underbody kit 20 at various steps, if required. In a number of variations, once the underbody kit 20 is lifted vertically toward the underbody 24 of the vehicle 22, the underbody kit 20 may be attached to the underbody 24 of the vehicle 22 using underbody kit 20 hardware 23, a variation of which is illustrated in FIG. 15, which may include, but is not limited to, a plurality of mechanical fasteners and/or adhesive (not illustrated).

Figure 17:
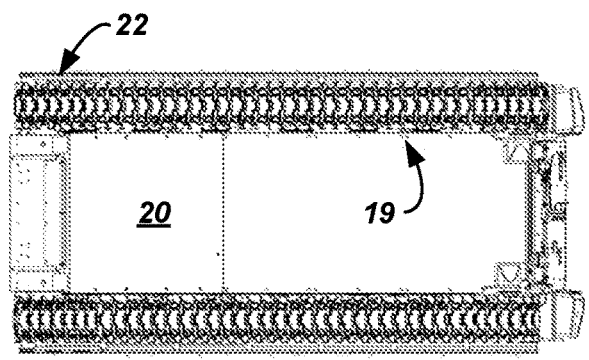
FIG. 17 illustrates a bottom view of an underbody kit attached to a vehicle according to a number of variations.

Referring to FIG. 17, in a number of variations, the underbody kit 20 may also include one or more alignment pins 19 which may mate with one or more alignment features (not illustrated) in the vehicle 22 to further assist in alignment of the underbody kit 20 during installation.

Figure 16:
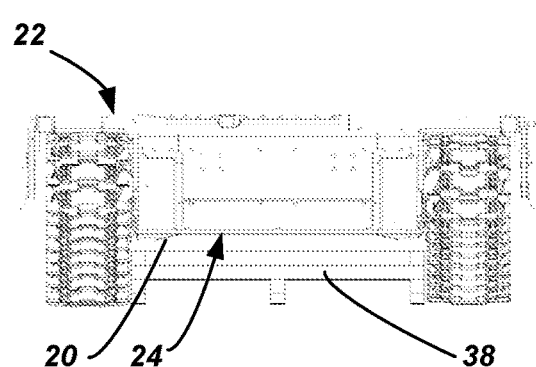
FIG. 16 illustrates an end view of a vehicle over a rapid underbody kit deployment crate pallet with an underbody kit attached to a vehicle according to a number of variations.
Figure 18:
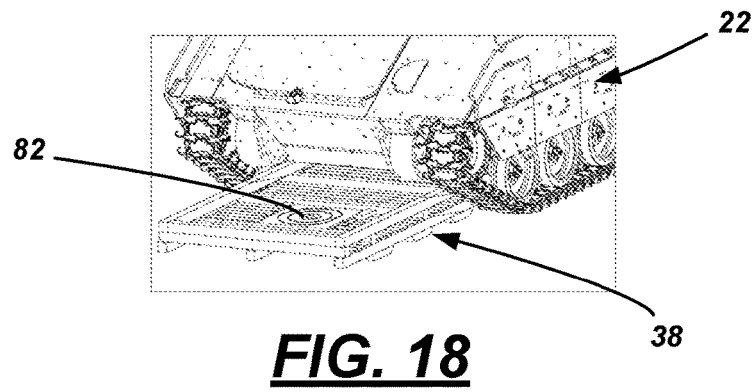
FIG. 18 illustrates a perspective view of a vehicle partially over a rapid underbody kit deployment crate pallet according to a number of variations.

Referring to FIG. 16, in a number of variations, once the underbody kit 20 is attached to the underbody 24 of the vehicle 22, the inflatable bladder(s) 82, 84 may be deflated. Referring to FIG. 18, in a number of variations, once the inflatable bladder(s) 82, 84 is deflated, the vehicle 22 may be driven away from the underbody kit pallet 38 and the installation of the underbody kit 20 onto the vehicle 22 may be complete.

Referring to FIGS. 1, and 11-18, in a number of variations, the rapid underbody kit deployment crate 10 may also be used to remove an underbody kit 20 from a vehicle 22. In a number of variations, a rapid underbody kit deployment crate 10 may be transported to a removal area including, but not limited to, a manufacturing area or in the field. Referring again to FIG. 11, in a number of variations, once the rapid underbody kit deployment crate 10 is transported to the desired removal location, the cover(s) 94, 96 of the rapid underbody kit deployment crate 10 may be removed from the pallet 38, as discussed above.

Referring to FIG. 18, in a number of variations, once the at least one cover 94, 96 is removed from the pallet 38, a vehicle 22 may be driven over the pallet 38. Referring to FIG. 14, in a number of variations, once the vehicle 22 is driven over the pallet 38, the inflatable bladder(s) 82, 84 may be inflated. In a number of variations, the at least one inflatable bladder 82, 84 may be inflated vertically upward so that it (they) may touch the underbody kit 20. In a number of variations, once the inflatable bladder(s) 82, 84 is inflated, the underbody kit 20 attachment hardware 23 (a variation of which is illustrated in FIG. 15) may be removed from the vehicle 22 and the underbody kit 20 which may allow the underbody kit 20 to rest on top of the inflatable bladder(s) 82, 84.

In a number of variations, once the underbody kit 20 is resting on the inflatable bladder(s) 82, 84, the inflatable bladder(s) 82, 84 may be deflated which may vertically lower the underbody kit 20 onto the underbody kit pallet 38, a variation of which is illustrated in FIG. 12. In a number of variations, if more than one inflatable bladder 82, 84 is used, the inflatable bladders 82, 84 may be deflated simultaneously to ensure steady lowering of the underbody kit 20 onto the underbody kit pallet 38 or independently depending on underbody kit 20 and vehicle 22 requirements. In a number of variations, once the inflatable bladder(s) 82, 84 is deflated, the vehicle 22 may be driven away from the rapid underbody kit deployment crate 10 and removal of the underbody kit 20 may be complete.

Referring to FIG. 1, in a number of variations, the at least one cover 94, 96 may be placed back onto the pallet 38. In a number of variations, the at least one cover 94, 96 may be placed back onto the pallet 38 by attaching one or more hooks on a crane or other lifting device (not illustrated) to the one or more attachment devices 160 on the at least one cover 94, 96 of the underbody kit 20, and then lifting the at least one cover 94, 96 and vertically lowering the cover(s) 94, 96 back onto the pallet 38. In a number of variations, the at least one cover 94, 96 may then be secured to the pallet 38 using one or more mechanical fasteners. In a number of variations, where a first cover segment 94 and a second cover segment 96 are used, the first cover segment 94 and the second cover segment 96 may be positioned on the pallet 38 such that the end walls 116 may be disposed on opposite ends of each other so that the underbody kit 20 may be enclosed. In a number of variations, the rapid underbody kit deployment crate 10 may then be used to store the underbody kit 20 or to ship the underbody kit 20.

Figure 19:
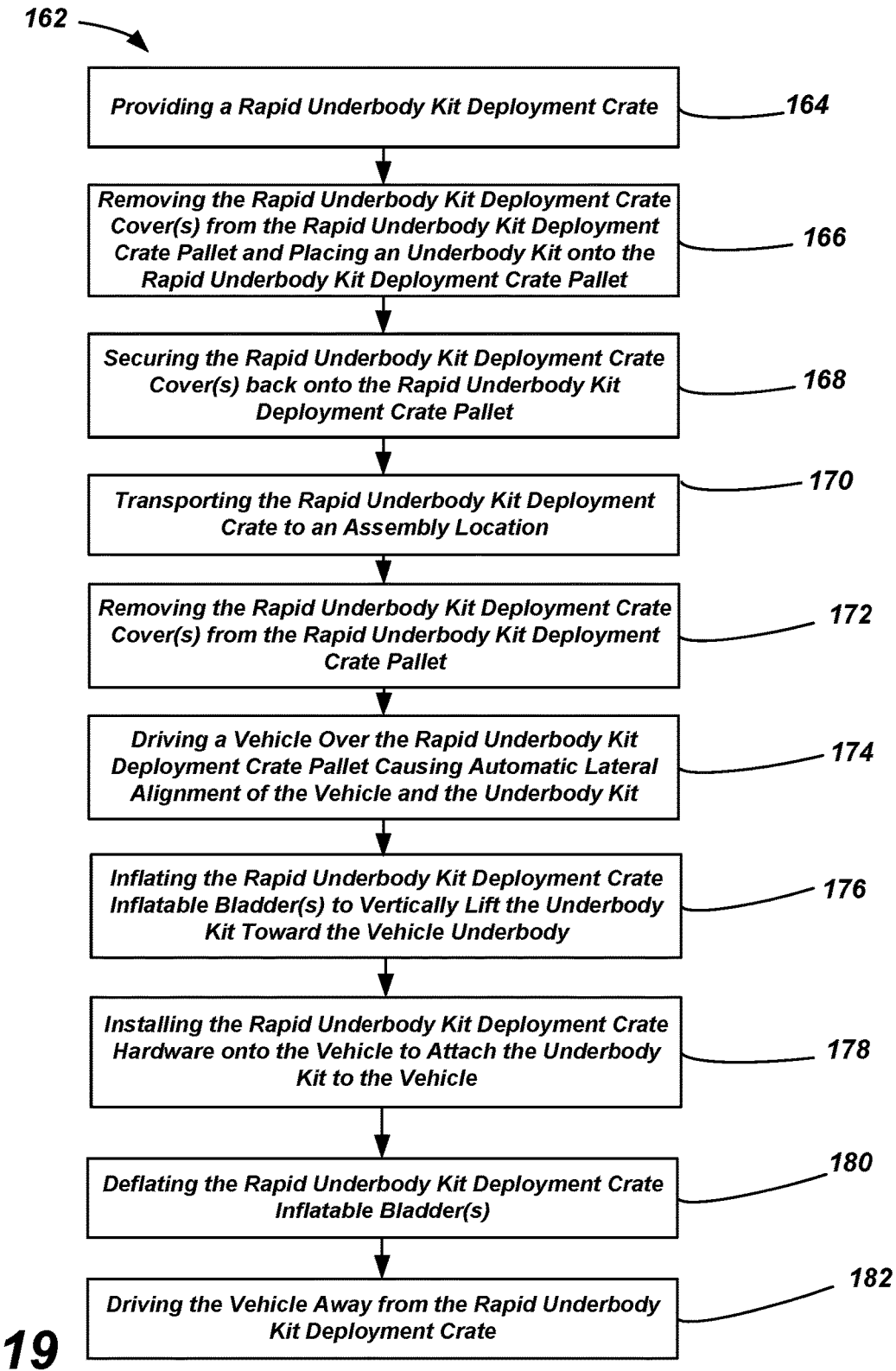
FIG. 19 illustrates a method of attaching an underbody kit to a vehicle according to a number of variations.

FIG. 19 illustrates a method 162 of installing an underbody kit 20 onto an underbody 24 of a vehicle 22 according to a number of variations. In a number of variations, a method 162 of installing an underbody kit 20 to a vehicle 22 may 22 include a first step 164 comprising providing a rapid underbody kit deployment crate 10 which includes a pallet 38, at least one inflatable bladder 82, 84, and at least one cover 94, 96. In a number of variations, a second step 166 may include removing the at least one cover 94, 96 from the rapid underbody kit deployment crate pallet 38 and placing the underbody kit 20 onto the pallet 38. In a number of variations, a third step 168 may include securing the at least one cover 94, 96 back onto the pallet 38. In a number of variations, a fourth step 170 may include transporting the rapid underbody kit deployment crate 10 to an assembly location. In a number of variations, a fifth step 172 may include removing the at least one cover 94, 96 from the rapid underbody kit deployment crate pallet 38. In a number of variations, a sixth step 174 may include driving a vehicle 22 over the pallet 38 causing automatic lateral alignment of the vehicle 22 and underbody kit 20. In a number of variations, a seventh step 176 may include inflating the at least one inflatable bladder 82, 84 to vertically lift the underbody kit 20 toward the vehicle 22 underbody 24. In a number of variations, an eighth step 178 may include installing the rapid underbody kit deployment crate hardware 23 onto the vehicle 22 to attach the underbody kit 20 to the underbody 24 of the vehicle 22. In a number of variations, a ninth step 180 may include deflating the at least one inflatable bladder 82, 84. In a number of variations, a tenth step 182 may include driving the vehicle 22 away from the rapid underbody kit deployment crate 10.

Figure 20:
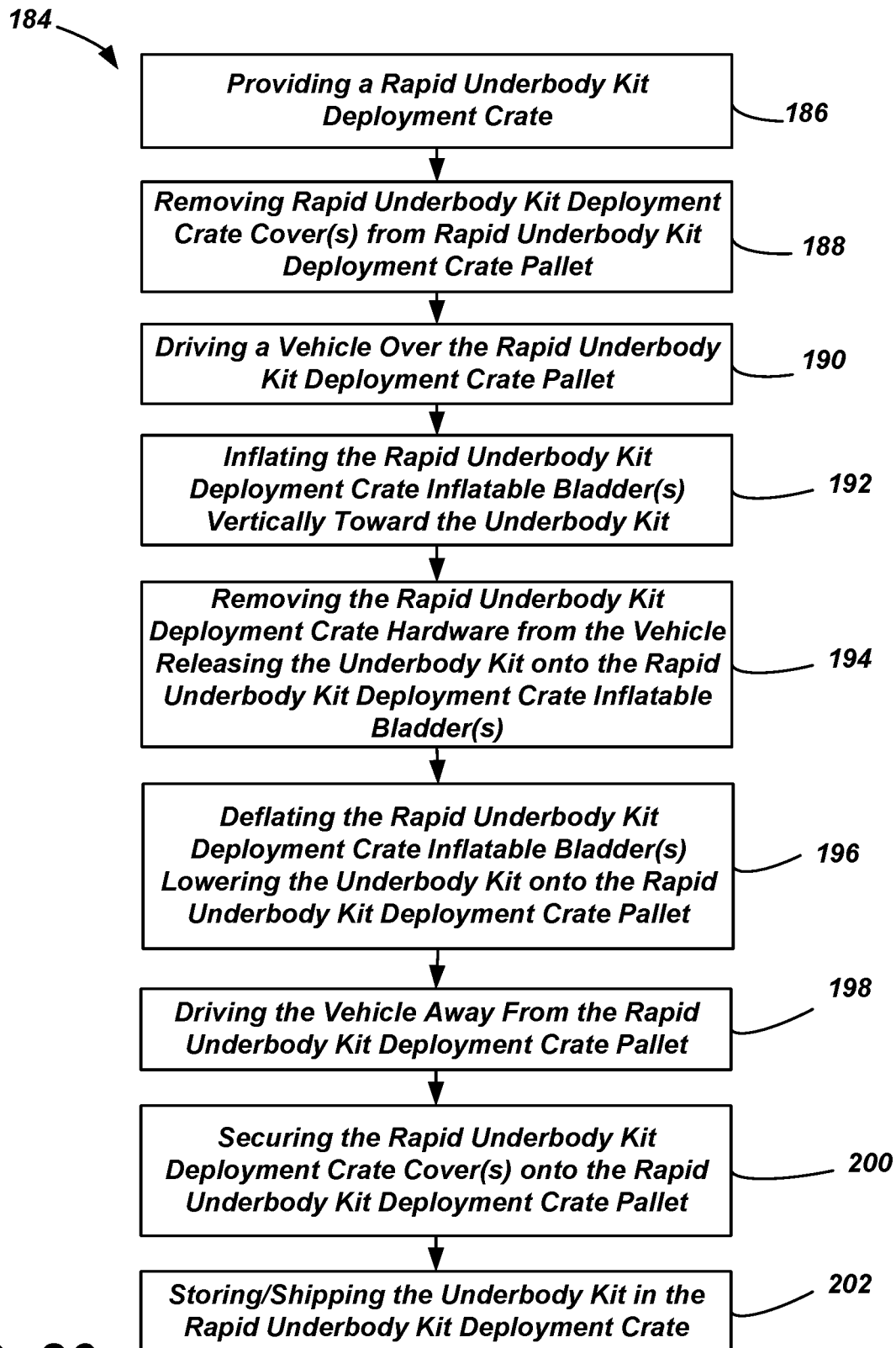
FIG. 20 illustrates a method of removing an underbody kit from a vehicle according to a number of variations.

FIG. 20 illustrates a method 184 of removing an underbody kit 20 from a vehicle 22 according to a number of variations. In a number of variations, a method 184 for removing an underbody kit 20 from a vehicle 22 may include a first step 186 comprising providing a rapid underbody kit deployment crate 10 which includes a pallet 38, at least one inflatable bladder 82, 84, and at least one cover 94, 96. In a number of variations, a second step 188 may include removing the at least one cover 94, 96 from the pallet 38. In a number of variations, a third step 190 may include driving a vehicle 22 over the rapid underbody kit deployment crate pallet 38. In a number of variations, a fourth step 192 may include inflating the at least one inflatable bladder 82, 84 toward the underbody kit 20. In a number of variations, a fifth step 194 may include removing the underbody kit hardware 23 from the vehicle 22 to release the underbody kit 20 from the vehicle 22 so that the underbody kit 20 rests on top of the at least one inflatable bladder 82, 84. In a number of variations, a sixth step 196 may include deflating the at least one inflatable bladder 82, 84 causing the underbody kit 20 to be lowered onto the rapid underbody kit deployment crate pallet 38. In a number of variations, a seventh step 198 may include driving the vehicle 22 away from the rapid underbody kit deployment crate pallet 38. In a number of variations, an eighth step 200 may include securing the at least one cover 94, 96 back onto the rapid underbody kit deployment crate pallet 38. In a number of variations, a ninth step 202 may include storing and/or shipping of the underbody kit 20 in the rapid underbody kit deployment crate 10.

In a number of variations, the use of a rapid underbody kit deployment crate 10 may significantly reduce the time, tooling, skill, and personnel needed to install or remove an underbody kit 20. In a number of variations, the rapid underbody kit deployment crate 10 may require much fewer steps and personal than may be required through installation or removal typically done in a production or depot environment. The use of an rapid underbody kit deployment crate 10 may also increase safety during installation and removal of an underbody kit 20 as it may reduce or eliminate the use of industrial equipment typically required during installation/removal of an underbody kit including, but not limited to, the use of winches, forklifts, cranes, hand jacks, jack stands, etc. as the underbody kit 20 may be lifted or lowered using the inflatable bladder(s) 82, 84. Further, the use of the rapid underbody kit deployment crate 10 may allow for installation and removal of underbody kits 20 rapidly in the field which may increase a soldier's readiness without the logistical burden of additional special tools or training. Even further, the rapid underbody kit deployment crate 10 may also be used for reusable storage and/or shipping of the underbody kit 20 which may eliminate duplicate costs.

The following description of variants is only illustrative of components, elements, acts, products, and methods considered to be within the scope of the invention and are in no way intended to limit such scope by what is specifically disclosed or not expressly set forth. The components, elements, acts, products, and methods as described herein may be combined and rearranged other than as expressly described herein and still are considered to be within the scope of the invention.

Variation 1 may include a rapid underbody kit deployment crate comprising a pallet constructed and arranged to accommodate an underbody kit; at least one inflatable bladder attached to the pallet, wherein the at least one inflatable bladder is constructed and arranged to vertically lift and lower the underbody kit; and at least one cover constructed and arranged to enclose the underbody kit and at least a portion of the pallet.

Variation 2 may include a rapid underbody kit deployment crate as set forth in Variation 1, wherein the at least one inflatable bladder is constructed and arranged to inflate when a fluid is supplied to the at least one inflatable bladder and to deflate when the fluid is removed from the at least one inflatable bladder.

Variation 3 may include a rapid underbody kit deployment crate as set forth in any of Variations 1-2, wherein the rapid underbody kit deployment crate is constructed and arranged to ship and store the underbody kit.

Variation 4 may include a rapid underbody kit deployment crate as set forth in any of Variations 1-3, wherein the pallet further comprises a floor having a first face, a second face opposite of the first face, a first end surface, a second end surface opposite of the first end surface, a first side surface, and a second side surface opposite of the first side surface; a first support beam attached to the first face of the floor adjacent the first side surface of the floor, a second support beam attached to the first face of the floor adjacent the second side surface of the floor, a third support beam attached to the first face of the floor adjacent the first end surface of the floor, and a fourth support beam attached to the first face of the floor adjacent the second end surface of the floor; and a plurality of skids attached to and spaced apart along the second face of the floor.

Variation 5 may include a rapid underbody kit deployment crate as set forth in Variation 4, wherein the floor further comprises a plurality of first beams and a plurality of second beams interposed between the plurality of first beams, wherein a height of each of the plurality of first beams is less than a height of each of the plurality of second beams.

Variation 6 may include a rapid underbody kit deployment crate as set forth in any of Variations 1-5, wherein the pallet further includes a plurality of rubbing strips attached to each of the plurality of skids.

Variation 7 may include a rapid underbody kit deployment crate as set forth in any of Variations 1-6, wherein the at least one cover comprises at least one panel, a first end wall extending downward from the at least one panel, a second end wall extending downward from the at least panel, opposite of the first end wall, at least one first side wall extending downward from the at least one panel between the first end wall and the second end wall, and at least one second side wall extending downward from the at least one panel between the first end wall and the second end wall, opposite of the at least one first side wall.

Variation 8 may include a rapid underbody kit deployment crate as set forth in any of Variations 1-7, wherein the at least one cover comprises a first cover segment and a second cover segment.

Variation 9 may include a rapid underbody kit deployment crate as set forth in Variation 8, wherein the first cover segment and the second cover segment each comprise a rectangular panel having a first face, a second face opposite of the first face, a first end surface, a second end surface opposite of the first end surface, a first side surface, and a second side surface opposite of the first side surface, a first side wall extending perpendicularly from the second face of the rectangular panel adjacent the first side surface of the rectangular panel, a second side wall extending perpendicularly from the second face of the rectangular panel adjacent the second side surface of the rectangular panel, and a third side wall extending perpendicularly from the second face of the rectangular panel adjacent the first end surface of the rectangular panel.

Variation 10 may include a rapid underbody kit deployment crate as set forth in any of Variations 1-9, wherein the at least one inflatable bladder comprises a first inflatable bladder and a second inflatable bladder spaced a distance from the first inflatable bladder.

Variation 11 may include a rapid underbody kit deployment crate as set forth in any of Variations 1-10, wherein a width of the pallet is approximately equal to a distance between a first inner surface of a first vehicle tire or track and a second inner surface of a second vehicle tire or track opposite of the first vehicle tire or track.

Variation 12 may include a method of installing an underbody kit to a vehicle comprising providing a rapid underbody kit deployment crate comprising a pallet, at least one inflatable bladder attached to the pallet, and at least one cover; removing the at least one cover from the pallet; placing the underbody kit onto the pallet and the at least one inflatable bladder; securing the at least one cover back onto the pallet; transporting the rapid underbody kit deployment crate to an assembly location; removing the at least one cover from the pallet; driving the vehicle over the rapid underbody kit deployment crate; inflating the at least one inflatable bladder with a fluid to vertically lift the underbody kit into installation position; installing the underbody kit to an underbody of the vehicle; deflating the at least one inflatable bladder by releasing the fluid from the at least one inflatable bladder; and driving the vehicle away from the rapid underbody kit deployment crate.

Variation 13 may include a method as set forth in Variation 12, wherein driving the vehicle over the rapid underbody kit deployment crate causes automatic lateral alignment of the underbody kit with an underbody of the vehicle.

Variation 14 may include a method as set forth in any of Variations 12-13, wherein inflating the at least one inflatable bladder with the fluid comprises flowing the fluid into the at least one inflatable bladder using a fluid compressor.

Variation 15 may include a method as set forth in any of Variations 12-14, further comprising controlling the inflating and the deflating of the at least one inflatable bladder using a controller.

Variation 16 may include a method as set forth in any of Variations 12-15, further comprising aligning the underbody kit with the underbody of the vehicle during inflation of the at least one inflatable bladder using at least one alignment pin on the underbody kit and at least one alignment feature on the vehicle.

Variation 17 may include a method of removing an underbody kit from a vehicle comprising providing an rapid underbody kit deployment crate comprising a pallet, at least one inflatable bladder attached to the pallet, and at least one cover; removing the at least one cover from the pallet; driving the vehicle over the pallet; inflating the at least one inflatable bladder with a fluid so that the at least one inflatable bladder reaches the underbody kit; removing the underbody kit from the vehicle thereby releasing the underbody kit onto the at least one inflatable bladder; deflating the at least one inflatable bladder by releasing the fluid from the at least one inflatable bladder; driving the vehicle away from the rapid underbody kit deployment crate; and securing the at least one cover back onto the pallet.

Variation 18 may include a method as set forth in Variation 17 further comprising storing or shipping the underbody kit in the rapid underbody kit deployment crate.

Variation 19 may include a method as set forth in any of Variations 17-18, wherein inflating the at least one inflatable bladder with the fluid comprises flowing the fluid into the at least one inflatable bladder with a fluid compressor.

Variation 20 may include a method as set forth in any of Variations 17-19, further comprising controlling the inflation and deflation of the at least one inflatable bladder using a controller.

The above description of select variations within the scope of the invention is merely illustrative in nature and, thus, variations or variants thereof are not to be regarded as a departure from the spirit and scope of the invention.

What is claimed is:

1. A method of installing an underbody kit to a vehicle comprising:
   providing a rapid underbody kit deployment crate comprising a pallet, at least one inflatable bladder attached to the pallet, and at least one cover;
   removing the at least one cover from the pallet;
   placing the underbody kit onto the pallet and the at least one inflatable bladder;

securing the at least one cover back onto the pallet;
transporting the rapid underbody kit deployment crate to an assembly location;
removing the at least one cover from the pallet;
driving the vehicle over the rapid underbody kit deployment crate;
inflating the at least one inflatable bladder with a fluid to vertically lift the underbody kit into installation position;
installing the underbody kit to an underbody of the vehicle;
deflating the at least one inflatable bladder by releasing the fluid from the at least one inflatable bladder; and
driving the vehicle away from the rapid underbody kit deployment crate.

2. The method of claim 1, wherein driving the vehicle over the rapid underbody kit deployment crate causes automatic lateral alignment of the underbody kit with an underbody of the vehicle.

3. The method of claim 1, wherein inflating the at least one inflatable bladder with the fluid comprises flowing the fluid into the at least one inflatable bladder using a fluid compressor.

4. The method of claim 1 further comprising controlling the inflating and the deflating of the at least one inflatable bladder using a controller.

5. The method of claim 1 further comprising aligning the underbody kit with the underbody of the vehicle during inflation of the at least one inflatable bladder using at least one alignment pin on the underbody kit and at least one alignment feature on the vehicle.

6. A method of removing an underbody kit from a vehicle comprising:
providing a rapid underbody kit deployment crate comprising a pallet, at least one inflatable bladder attached to the pallet, and at least one cover;
removing the at least one cover from the pallet;
driving the vehicle over the pallet;
inflating the at least one inflatable bladder with a fluid so that the at least one inflatable bladder reaches the underbody kit;
removing the underbody kit from the vehicle thereby releasing the underbody kit onto the at least one inflatable bladder;
deflating the at least one inflatable bladder by releasing the fluid from the at least one inflatable bladder;
driving the vehicle away from the rapid underbody kit deployment crate; and
securing the at least one cover back onto the pallet.

7. The method of claim 6 further comprising storing or shipping the underbody kit in the rapid underbody kit deployment crate.

8. The method of claim 6, wherein inflating the at least one inflatable bladder with the fluid comprises flowing the fluid into the at least one inflatable bladder with a fluid compressor.

9. The method of claim 6 further comprising controlling the inflation and deflation of the at least one inflatable bladder using a controller.

* * * * *